May 8, 1934. S. M. WRIGHT ET AL Re. 19,160

FISHING FLY

Original Filed Jan. 29, 1925

INVENTORS
STANLEY M. WRIGHT
ANDREW D. McGILL
BY
R. H. Galbreath
ATTORNEY.

Reissued May 8, 1934

Re. 19,160

UNITED STATES PATENT OFFICE 19,160

FISHING FLY

Stanley M. Wright and Andrew D. McGill, Denver, Colo., assignors to Wright and McGill Company, Denver, Colo., a corporation of Colorado Original No. 1,657,734, dated January 31, 1928, Serial No. 5,622, January 29, 1925. Application for reissue December 9, 1933, Serial No. 703,022

2 Claims. (Cl. 43—48)

This invention relates to fishing flies. Flies of this character are usually built up of feathers colored and designed to simulate natural flies or other insects. In use, the flies are allowed to float upon the surface and with the current of a stream. When the limit of the fishing line is reached, they are withdrawn from the water and thrown with a sharp whipping action upon the upstream surface so that they may again float downward with the current. This whipping through the air soon results in destroying and fraying the feather structures of the wings of the flies.

When the flies are first formed, the feather is held in shape by the inter-locking of the vexilla and tendrils of the natural feather. Under normal conditions this inter-locking of the tendrils and vexilla is sufficient to maintain the web of the feather in its original form, but when subjected to the whipping action of the fish line, this natural inter-locking relation is insufficient to withstand the service. As a result, the feather is soon frayed out and each individual vane becomes independent from its neighbor. This fraying is especially rapid when the flies are used in swift mountain streams where they are subjected to the action of the current and to battering upon rocks.

Fishing flies have been treated with oils, paraffine, waxes, etc., in an endeavor to render them water-proof, and to prevent fraying. The oils, however, serve no purpose in holding the component parts of the feather together. The paraffines have insufficient tensile strength to tie the various parts so that they will withstand the strain. In fact, feathers treated with paraffine have been found to "whip out" almost as readily as the untreated feather. The usual trade varnishes, formed of oils, turpentines, gums, etc., have been used by the applicants in an endeavor to prevent fraying of the fly but they were found to discolor the feather and could not therefore be used on white wings. The usual trade varnish also appears to affect the attraction of the fly for the fish. Many successful fishermen will not use a fly with varnished wings for this reason.

The principal object of this invention is to provide a process and medium for treating the feathers of a fishing fly which will securely tie the component parts of the feather together; which will form a flexible transparent waterproof casing over the entire feather structure and which will not in itself discolor and which will not affect the color of the feather.

Another object of the invention is to provide a substance for this purpose which will dry quickly so as to facilitate the maunfacture of fishing flies.

Figure 1:
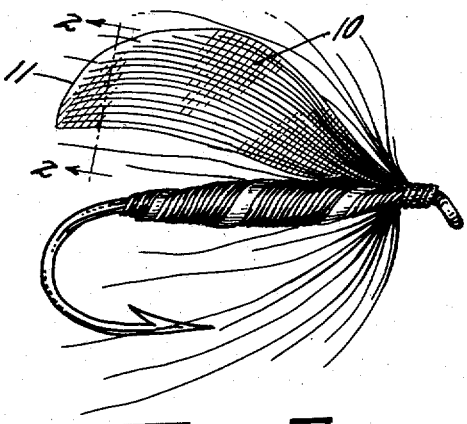
Figure 2:
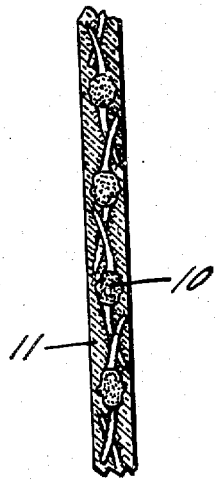

Other objects and advantages reside in our invention which will become more apparent from the following detailed description, reference being had to the accompanying drawing. In the drawing: Fig. 1 illustrates a fishing fly with the invention embodied; Fig. 2 is a cross section through the wing taken on the line 2—2, Fig. 1. The views are greatly magnified.

We attain the above objects by coating the feathers with nitro-cellulose preferably dissolved in amyl acetate. The amyl acetate soon evaporates and leaves a uniform, impervious, transparent, flexible, waterproof, celluloid-like film over the entire structure through which the natural colors of the feather can be seen undiminished and unchanged. The coating is applied either by dipping the entire fly and hook therein, or by applying it only to the wings of the fly with a small brush.

In order to stiffen the feather in wings of those types of flies which have a comparatively large wing area, it is the present custom to employ a secondary stiffening wing or feather to serve as a support for the main wing. With the use of our process and medium, however, it is unnecessary to employ a stiffening wing, since the flexible celluloid-like film acts as a stiffener and the cost of manufacture of the large wing flies is thereby greatly lessened.

Unlike the film of the usual trade varnishes, the celluloid-like casing or coating will not dry out and become brittle but will maintain its flexibility indefinitely. An ordinary gum varnish coating upon the wings of a fly requires from two to three days to dry sufficiently for the flies to be packed. The amyl acetate, however, evaporates quickly and the flies are ready for packing in 15 to 20 minutes, thereby greatly increasing the ease of manufacture and reducing the cost thereof.

One of the applicants has an application pending, to wit Serial No. 536,452, filed February 14, 1922, in which the use of nitro-cellulose is mentioned. At this time, however, the most suitable solvent for nitro-cellulose was not known. The applicants have found that amyl-acetate is the most suitable solvent for dissolving nitro-cellulose to produce the product desired. altho, of course, other solvents may be used. The evaporation of the amyl acetate leaves a film consisting in the main of nitro-cellulose.

In the drawing the wing of a fly is shown at 10 completely surrounded by a film, coating, or casing, consisting of nitro-cellulose.

The term "celluloid" as used herein is to designate the transparent, flexible coating, film or residue remaining after the evaporation of the solvent without regard to the chemical constituents thereof.

While we have described in some detail, methods of applying our improved medium, and of carrying out our process, it is understood that our invention is not limited to the precise procedure described nor is it dependent upon the accuracy of the theories which we have advanced. On the contrary, our invention is not to be regarded as limited except in so far as such limitations are included within the terms of the accompanying claims, in which it is our intention to claim all novelty inherent in our invention as broadly as is permissible in view of the prior art.

Having thus described our invention, what we claim and desire secured by Letters Patent is:—

1. A fishing fly comprising a body portion; wings attached to said body portion; and a celluloid coating surrounding said wings.

2. The combination with a fishing fly, having wings, of a transparent celluloid casing completely surrounding said wings.

STANLEY M. WRIGHT.
ANDREW D. McGILL.